July 31, 1951   O. E. ANDRUS   2,562,254
ELECTROMAGNETIC DEVICE AND METHOD OF MAKING SAME
Filed Jan. 21, 1948   2 Sheets-Sheet 1
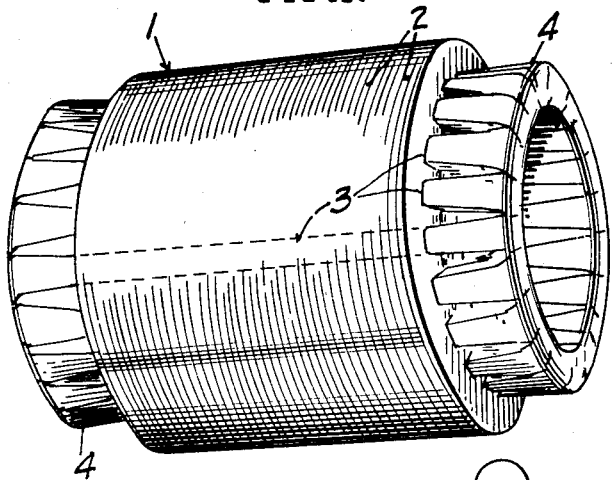
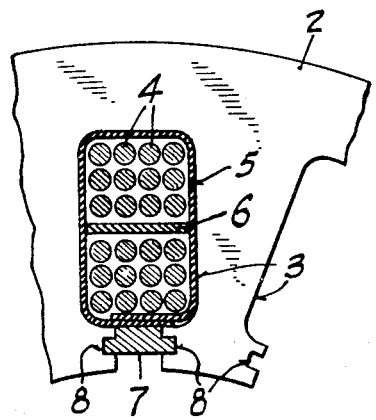
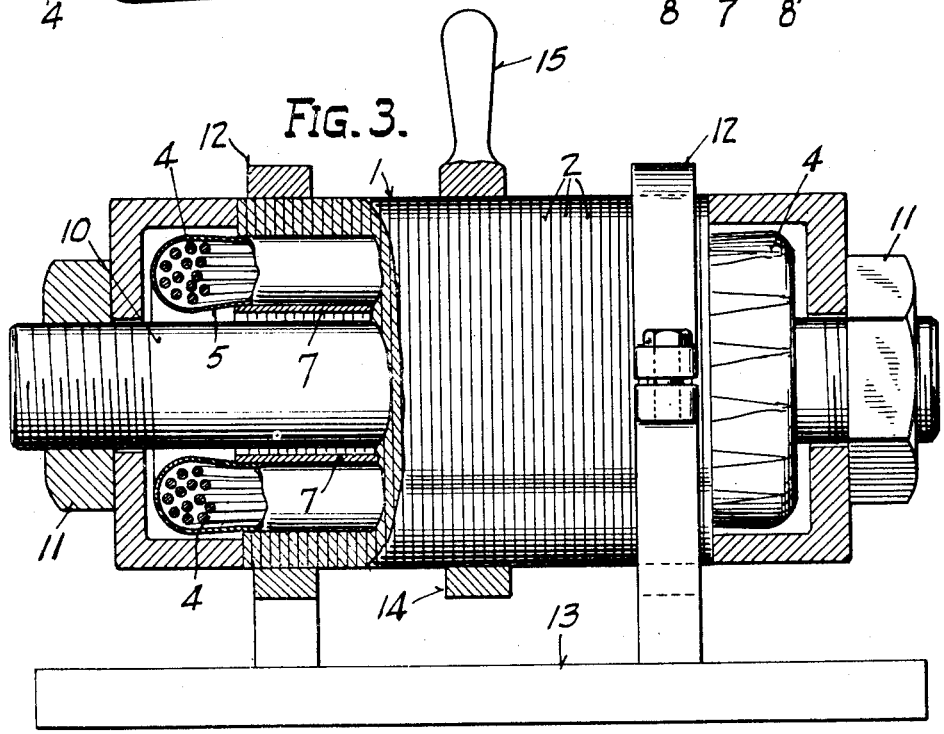
INVENTOR.
Orrin E. Andrus
BY
ATTORNEY.

July 31, 1951     O. E. ANDRUS     2,562,254
ELECTROMAGNETIC DEVICE AND METHOD OF MAKING SAME
Filed Jan. 21, 1948     2 Sheets-Sheet 2
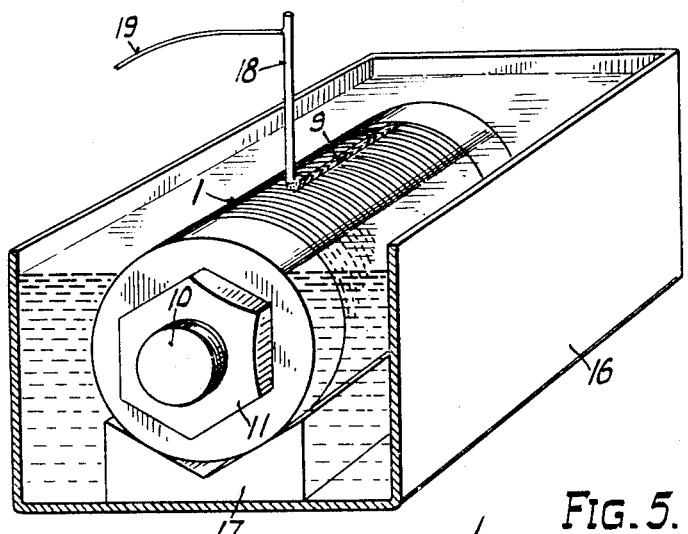
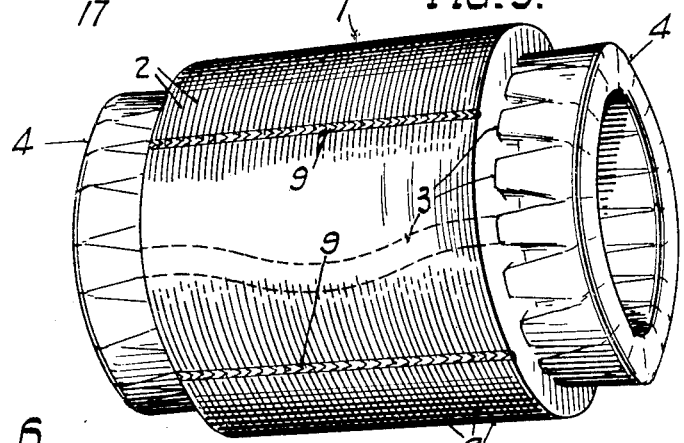
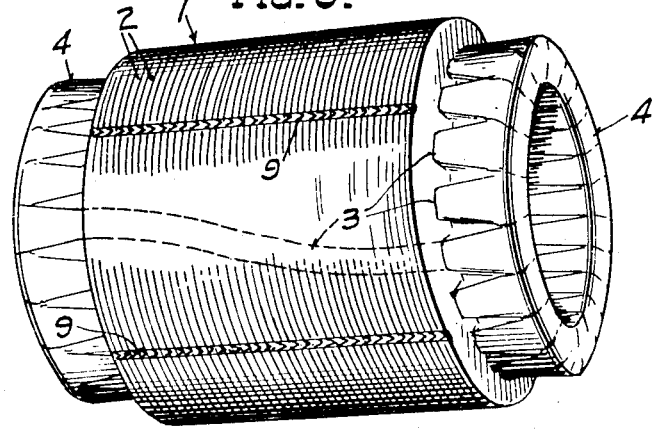
INVENTOR.
Orrin E. Andrus
ATTORNEY.

Patented July 31, 1951

2,562,254

UNITED STATES PATENT OFFICE 2,562,254

ELECTROMAGNETIC DEVICE AND METHOD OF MAKING SAME

Orrin E. Andrus, Altadena, Calif., assignor to A. O. Smith Corporation, Milwaukee, Wis., a corporation of New York Application January 21, 1948, Serial No. 3,384

2 Claims. (Cl. 171—252)

This invention relates to an electromagnetic device such as a motor stator and the method of making same.

The steel, copper, varnish, paper and slot sticks in electromagnetic apparatus, such as a motor stator have different thermal coefficients of expansion. In large motors, in particular, the differences in expansion of the various parts is appreciable and the copper coils tend to move with respect to the core. The insulation under these conditions is likely to crack and separate causing electrical breakdown and failure.

One object of the invention is to remedy the described condition by providing a stator or other electromagnetic apparatus in which the laminations are twisted or offset and the windings bound thereto and to each other so that the laminations and windings move as a unit.

Another object is to provide a stator in which the laminations are twisted and held in a crimped state by welding.

Another object is to provide a method of constructing a twisted motor winding to prevent injury to insulation by differences in the expansion and contraction of the parts.

Another object is to provide a stator in which the laminations and windings are bound together in such a manner that there is no great movement of one with respect to the other in a single area which would produce failure of insulation.

A further object is to bind the windings within the laminations to prevent injury to the windings by chaffing from vibration.

Other objects and advantages of the invention will appear hereinafter in connection with the following description of several embodiments of the invention illustrated in the accompanying drawing in which:

Figure 1 is a perspective view of a stator before twisting;

Fig. 2 is a fragmentary transverse section through the stator with windings assembled therein and ready for twisting;

Fig. 3 is a sectional view of a stator confined in clamping dies preparatory to twisting the same;

Fig. 4 is a view showing the method of welding the stator after twisting;

Fig. 5 is a perspective view showing a stator after twisting; and

Fig. 6 is a view similar to Fig. 5 showing the stator twisted in another manner.

The invention is illustrated by the stator 1 formed of a plurality of stacked laminations 2 having slots 3 to receive the windings 4. The slots 3 are lined with a suitable insulating material 5, such as paper or the like.

The windings may be assembled in slots 3 in a number of different ways. They may, for example, be preformed and inserted in the slots as a unit or the individual conductors may be progressively introduced into the slots. Ordinarily the parting strip 6 is provided in each slot to lessen the voltage differences between the conductors of the windings.

The insulating material 5 is preferably lapped at the mouth of each slot 3 to enclose windings 4 within the slots and slot stick 7 of soft non-magnetic metal or synthetic material is located in the longitudinal groove 8 adjacent the mouth of each slot 3 to close the slot and hold the windings in place.

The laminations 2 of stator 1 are twisted or offset axially with respect to each other and the windings 4 are bound within the laminations in the twisting operation, as will be described more fully hereinafter.

The laminations 2 are held in a twisted state by a plurality of welds 9 which extend the length of the stator. Mechanical means, however, may also be employed to hold the laminations after twisting is accomplished.

In carrying out the invention the laminations 2 are first stacked together with slots 3 in longitudinal alignment. Thereafter the slots are lined with insulating material 5 and the windings 4 are inserted with the parting strip 6 being disposed midway of each slot to separate the conductors. The insulating material 5 is then lapped at the mouth of the slot and each slot stick 7 is slipped into its respective groove 8.

The twisting of the stator can be accomplished in a number of different ways and the twist or offset of the laminations 2 may take several forms. Thus the stator may be twisted along the entire length or the slots merely arched in a single arc. Figs. 5 and 6 show a slot of the stator after twisting and illustrate several embodiments of the invention.

Fig. 3 illustrates apparatus for twisting laminations 2. In carrying out the twisting operation, after assembly of the windings 4 and laminations 2 of the stator 1, the mandrel 10 is inserted through the air gap of the stator and nuts 11 are threaded onto the ends of the mandrel and against spacer members engaging the outermost laminations 2. The nuts 11, however, are not initially tightened in place.

The entire assembly is then placed in a fixture comprising split clamps 12 at each end and which are supported on a base member 13. The split clamp 14 is assembled around the center of the stator 1. The clamp 14 is rotatable and is rotated by handle 15. The clamps 12 and clamp 14 are secured around the stator by suitable bolts. When handle 15 of center clamp 14 is grasped and pushed or pulled by the operator the clamps 12 securely hold the stator at either end and the laminations 2 are twisted or offset as desired.

The offset or twisting of the laminations to bind or pinch the windings 4 within intimate contact with themselves and with the laminations 2 should be sufficient to force the windings 4 and laminations 2 to expand and contract as a unit.

After twisting the laminations 2, as described, the nuts 11 are tightened securely against the spacers engaging the laminations, the stator 1 is then removed from the clamps 12 and clamp 14 of the twisting fixture, and the laminations 2 are permanently joined together in the twisted state by longitudinal electric arc welds 9 or other suitable means.

It is preferable, however, to join the laminations together by welds 9. In carrying out the welding operation it is necessary to prevent the welding heat from penetrating to windings 4 and injuring the same.

The stator 1, still retained in a twisted condition upon mandrel 10 by nuts 11, after removal from the twisting dies, is placed in tank 16, on V-shaped support 17. Tank 16 is filled with water up to a line where only the upper longitudinal portion of the laminations 2 of the stator 1 are exposed.

The welds 9 are then made by depositing weld metal along the length of the laminations by a welding rod 18 which is connected to a welding generator, not shown, through cable 19. Fig. 4 illustrates how one of the longitudinal welds 9 is made. When one weld is made, the stator 1 is rotated to another position by the operator and another weld 9 is then made along the longitudinally exposed portion of the stator. The water in tank 16 carries away the heat of the arc and prevents the windings from being burned.

After the welding is completed the stator 1 is lifted from the tank 16, the nuts 11 are unthreaded and the stator is removed from mandrel 10.

The stator may be completed by being dried, impregnated with varnish and baked.

Under the invention, the laminations and windings expand and contract substantially as a unit and there is no tendency of the windings to slide in and out of slots 3 in service. Strain on the varnish insulation is held at a minimum and breaking thereof which would ordinarily occur if the windings were free to move away from and through the laminations is prevented. The tightness and the crookedness of the windings throughout the length of the entire stator insure that there will be no separate movement with respect to the laminations and the windings.

The insulating material 5 separating windings 4 from laminations 2 prevents damage to the windings when the latter are bound tightly within the laminations. The material 5 also stretches to some extent in service to take up minor differences in expansibility between the iron laminations 2 and copper windings 4.

Where the twisted stator is employed it is unnecessary to twist the rotor bars of the rotor with which the stator is used. In addition the winding coils are assembled more readily since the mouth of the slots may be initially wider for assembling the coils as the twisting of the core narrows the mouth of the slots in the final core.

Various embodiments of the invention may be employed within the scope of the accompanying claims.

I claim:

1. A twisted laminated core having the corresponding slots of the laminations thereof offset from each other, motor windings disposed in said slots before offset thereof and bound within said core by offset of the laminations to effect substantially unitary movement of the laminations of the core and the windings under thermal expansion and contraction in service, and a longitudinally extending member separate from said windings and securing said laminations in offset relation.

2. A twisted laminated core having longitudinal slots extending through the laminations of the core with the corresponding slots of individual laminations offset circumferentially in the core, motor windings disposed in said slots before offset thereof and bound in intimate contact with said laminations and with each other by offset of the laminations to provide for substantially unitary movement of the laminations and windings under thermal expansion and contraction in service, and an interlock between said laminations to secure the same in offset relation.

ORRIN E. ANDRUS.

REFERENCES CITED

The following references are of record in the file of this patent:

UNITED STATES PATENTS

| Number | Name | Date |
| --- | --- | --- |
| 1,150,049 | Martin | Aug. 17, 1915 |
| 2,012,021 | Petersen | Aug. 20, 1935 |
| 2,248,167 | Elsey | July 8, 1941 |
| 2,386,138 | Rancher | Oct. 2, 1945 |
| 2,448,785 | Dolan | Sept. 7, 1948 |

FOREIGN PATENTS

| Number | Country | Date |
| --- | --- | --- |
| 167,285 | Switzerland | May 1, 1934 |